United States Patent
Levin et al.

(10) Patent No.: US 7,458,554 B1
(45) Date of Patent: *Dec. 2, 2008

(54) PORTABLE SIGN STAND WITH SIGN RELEASE MECHANISM

(75) Inventors: Yevgeniy M Levin, Novi, MI (US); David U Hillstrom, Novi, MI (US)

(73) Assignee: Marketing Displays, Inc., Farmington Hills, MI (US)

( * ) Notice: Subject to any disclaimer, the term of this patent is extended or adjusted under 35 U.S.C. 154(b) by 504 days.

This patent is subject to a terminal disclaimer.

(21) Appl. No.: 10/347,826

(22) Filed: Jan. 21, 2003

Related U.S. Application Data

(63) Continuation-in-part of application No. 10/041,345, filed on Jan. 8, 2002, now Pat. No. 6,755,381.

(51) Int. Cl.
*F16M 11/00* (2006.01)
(52) U.S. Cl. .................. 248/408; 248/161; 40/606.01
(58) Field of Classification Search ................. 248/121, 248/125.2, 161, 408, 163.1, 125.8; 40/606.01, 40/606.14, 607.01; 267/158, 159, 160; 29/434, 29/436, 437, 451, 525.01; 403/109.6, 229
See application file for complete search history.

(56) References Cited

U.S. PATENT DOCUMENTS

| | | | | |
|---|---|---|---|---|
| 601,613 A | | 3/1898 | Castle ......................... | 403/325 |
| 691,050 A | | 1/1902 | Dronne ........................ | 403/325 |
| 2,202,237 A | | 5/1940 | Sullivan ....................... | 40/145 |
| 2,361,119 A | * | 10/1944 | Owens ......................... | 160/24 |
| 3,171,626 A | | 3/1965 | Keats .......................... | 248/122 |
| 3,608,935 A | | 9/1971 | Hodapp ........................ | 403/325 |
| 3,966,247 A | * | 6/1976 | Muller et al. ................. | 292/318 |
| 4,507,887 A | | 4/1985 | Seely .......................... | 40/606 |
| 4,548,379 A | * | 10/1985 | Seely et al. ................... | 248/624 |
| 4,593,879 A | | 6/1986 | Seely et al. ................... | 248/624 |
| 4,676,015 A | | 6/1987 | Stoudt ......................... | 40/608 |
| 4,842,311 A | * | 6/1989 | White .......................... | 292/85 |
| 4,888,894 A | | 12/1989 | Brown, Jr. .................... | 40/606 |
| 4,954,008 A | | 9/1990 | Dicke et al. ................... | 403/24 |
| 5,152,091 A | | 10/1992 | Leach .......................... | 40/603 |
| 5,231,778 A | * | 8/1993 | Belobraydich et al. ......... | 40/610 |
| 5,472,162 A | | 12/1995 | Mason ......................... | 248/121 |
| 5,525,000 A | | 6/1996 | Belobraydich et al. ......... | 403/102 |
| 5,584,810 A | * | 12/1996 | Brimhall ...................... | 604/110 |
| 5,683,201 A | | 11/1997 | Guaron ........................ | 403/325 |
| 5,725,186 A | * | 3/1998 | Hillstrom et al. .......... | 248/176.1 |
| 6,032,908 A | * | 3/2000 | Hillstrom et al. ............ | 248/158 |

(Continued)

FOREIGN PATENT DOCUMENTS

FR 423205 4/1911 .................. 403/96

*Primary Examiner*—A. Joseph Wujciak, III
(74) *Attorney, Agent, or Firm*—Harness, Dickey & Pierce, P.L.C.

(57) ABSTRACT

A portable sign assembly is provided and includes a sign assembly that is selectively interconnected with a base assembly. The sign assembly includes a vertical brace extending therefrom that is in sliding engagement with an upright of the base assembly. A sign release mechanism is further provided and is disposed on the upright for releasably securing the sign and base assemblies. The release mechanism includes a lock-pin that is slidably disposed through the upright and is biased in a first position by a spring member disposed within the upright. The lock-pin selectively engages the vertical brace for prohibiting sliding motion between the vertical brace and the upright.

29 Claims, 6 Drawing Sheets

U.S. PATENT DOCUMENTS

| | | | | |
|---|---|---|---|---|
| 6,041,584 A | * | 3/2000 | Hohnl | 56/17.2 |
| 6,056,250 A | * | 5/2000 | Hillstrom et al. | 248/127 |
| 6,237,883 B1 | * | 5/2001 | Levin et al. | 248/176.1 |
| 6,755,381 B1 | * | 6/2004 | Levin et al. | 248/163.1 |

* cited by examiner

PORTABLE SIGN STAND WITH SIGN RELEASE MECHANISM

CROSS-REFERENCE TO RELATED APPLICATIONS

This application is a continuation-in-part of U.S. patent application Ser. No. 10/041,345 filed on Jan. 8, 2002.

FIELD OF THE INVENTION

The present invention relates to portable sign stands, and more particularly, to a sign release mechanism for adjustably locking a sign to a sign stand.

BACKGROUND OF THE INVENTION

There are many uses for signage products today, particularly for point of purchase advertising and promotion, as well as for construction site warnings and information. Many of these signage products utilize sign stands or sign holders for temporarily locating and displaying signs of various sizes and shapes. Rigid signs have typically been used in such applications. However, there has been a recent trend, particularly with traffic control signage, towards the use of flexible, roll-up signs, which have been well-received due to their lightweight and compact nature. It is anticipated that this trend will continue due to benefits gained by the compactness, portability and storability of flexible sign systems, as well as the durability of their design and the minimal maintenance required for their upkeep.

In general, various portable sign stands have been developed which utilize an upright that is attached to a base assembly having a leg assembly. The base assembly often includes a resilient member between the leg assembly and the upright to control deflection of the sign whenever a force is applied thereto, such as a gust of wind impinging upon the sign panel. The flexible roll-up sign has a pair of brace members attached to the corners of a flexible sign panel which in a deployed or use position form a cross configuration. The flexible roll-up sign and cross brace assembly are releasably secured to the sign stand by a locking sign release mechanism.

Signage systems of the type described above have several moving parts that must operate easily and repeatedly in adverse conditions with little or no maintenance. These signage systems are commonly set up along busy roads and highways such that continuous efforts are made to improve the ease of use and durability of these systems. In this regard, there is a need to provide an improved release mechanism for the sign assembly, and more particularly to provide a simpler, more cost-effective sign release mechanism that comprises fewer components and requires less assembly. Additionally, it is desirable to provide a sign release mechanism that requires no significant maintenance and is substantially wear-resistant.

SUMMARY OF THE INVENTION

The present invention is directed to a portable sign stand having a sign release mechanism that comprises a minimal number of components. In this manner, manufacture is simplified and costs are reduced.

The present invention provides a portable sign assembly including a vertical brace, a base assembly having an upright for selectively receiving the vertical brace therein to support the sign assembly and a release mechanism for selectively interconnecting the sign assembly and the base assembly. The release mechanism includes a lock-pin slidably disposed through a first cavity of the upright between one of either a first and second position. When in the first position the lock-pin extends into a second cavity of the upright when in the second position the lock-pin is withdrawn from the second cavity. The release mechanism further includes a biasing member disposed within the first cavity of the upright which couples to the lock-pin for biasing the lock-pin in said first position. When the lock-pin is in the first position, the lock-pin prohibits sliding of the vertical brace relative to the upright and in the second position enables relative sliding motion of the vertical brace to the upright.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
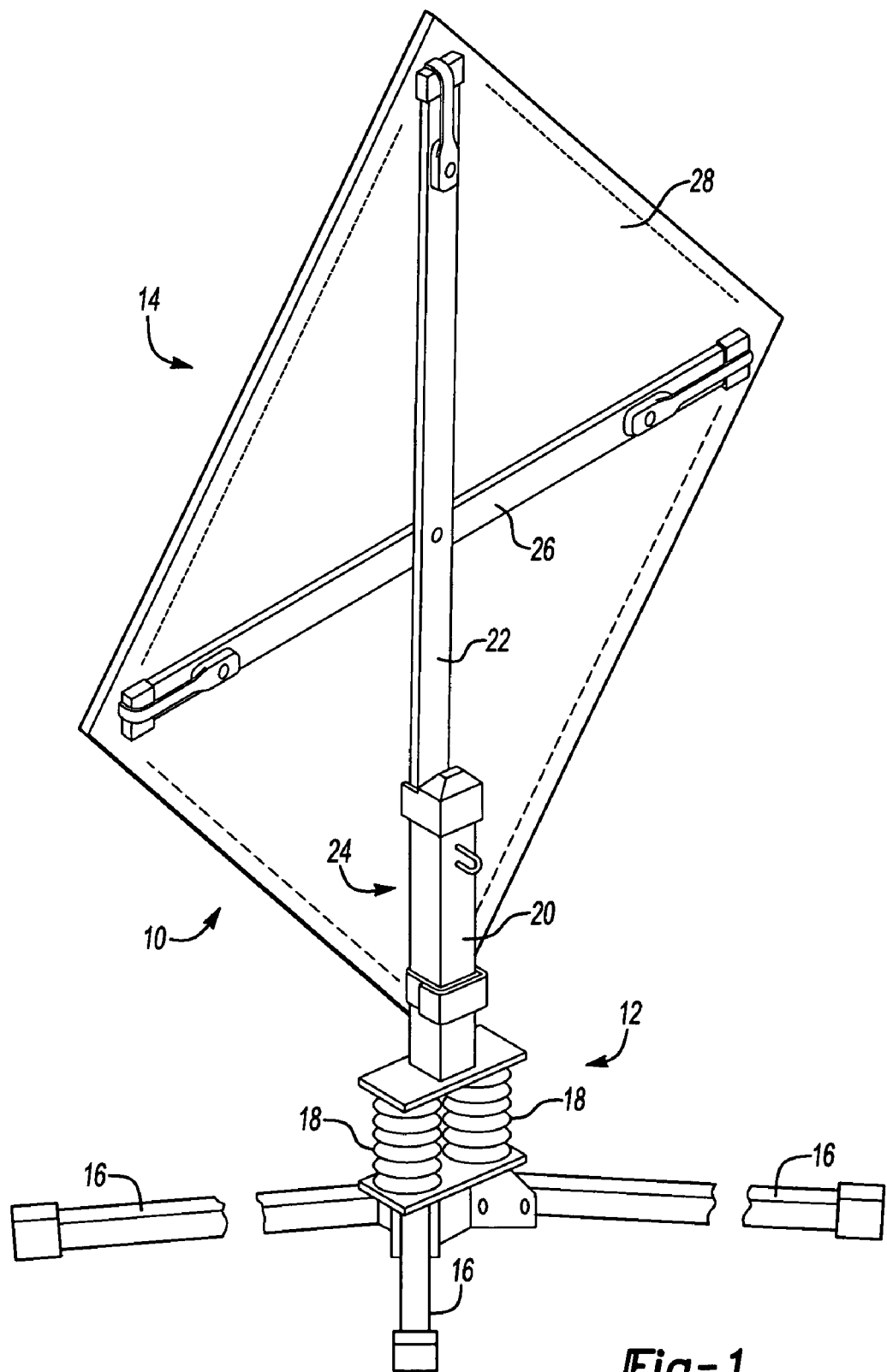
FIG. 1 is an environmental perspective view of the portable sign stand of the present invention.

With reference to FIG. 1 and in accordance with the teachings of the present invention, a portable sign assembly 10 is provided having a base assembly 12 and a sign assembly 14. The base assembly 12 has a plurality of legs 16 extending outwardly therefrom. The legs 16 are generally positionable between a retracted position wherein the legs are positioned closely parallel to the upright for convenient storage and a protracted position wherein the legs extend outwardly from the upright for securely supporting the sign. A leg release mechanism is typically incorporated into the base assembly for releasably securing the legs in the retracted or protracted positions. A preferred embodiment of such a leg release mechanism is disclosed U.S. patent application Ser. No. 10/041,345 entitled "Portable Sign Stand With Leg Release Mechanism filed on Jan. 8, 2002, the disclosure of which is incorporated herein by reference.

A resilient member 18 extends upwardly from the base assembly 12 and an upright 20 extends upwardly from the base assembly 12 with a resilient member interposed therebetween. The upright 20 selectively receives a portion of a vertical brace 22 of the sign assembly 14 and further includes a sign release mechanism 24 for selectively fixing the vertical brace 22 within the upright 20. The sign assembly 14 includes the vertical brace 22 and a horizontal brace 26 for forming a cross configuration for supporting a flexible sign panel 28. As presently preferred, the resilient member 18 is operably disposed between the base assembly 12 and the upright 20 such that the sign assembly 10 is resiliently supported from the base assembly 12 in a manner well-known in the art. It should be appreciated that while the resilient member 18 is depicted as a double coil spring assembly, it may comprise a single coil spring or consist of any other component or components that have the required resilience characteristics.

With reference to FIGS. 2-6, the sign release mechanism 24 is disposed on an upper end of the upright 20 for releasably interconnecting the sign assembly 12 and base assembly 14. The sign release mechanism 24 of the present invention utilizes a lock-pin and spring element to provide a sign release function in a manner similar to lock-pin and spring element disclosed in the above-referenced United States patent application to provide a leg release function.

Figure 2:
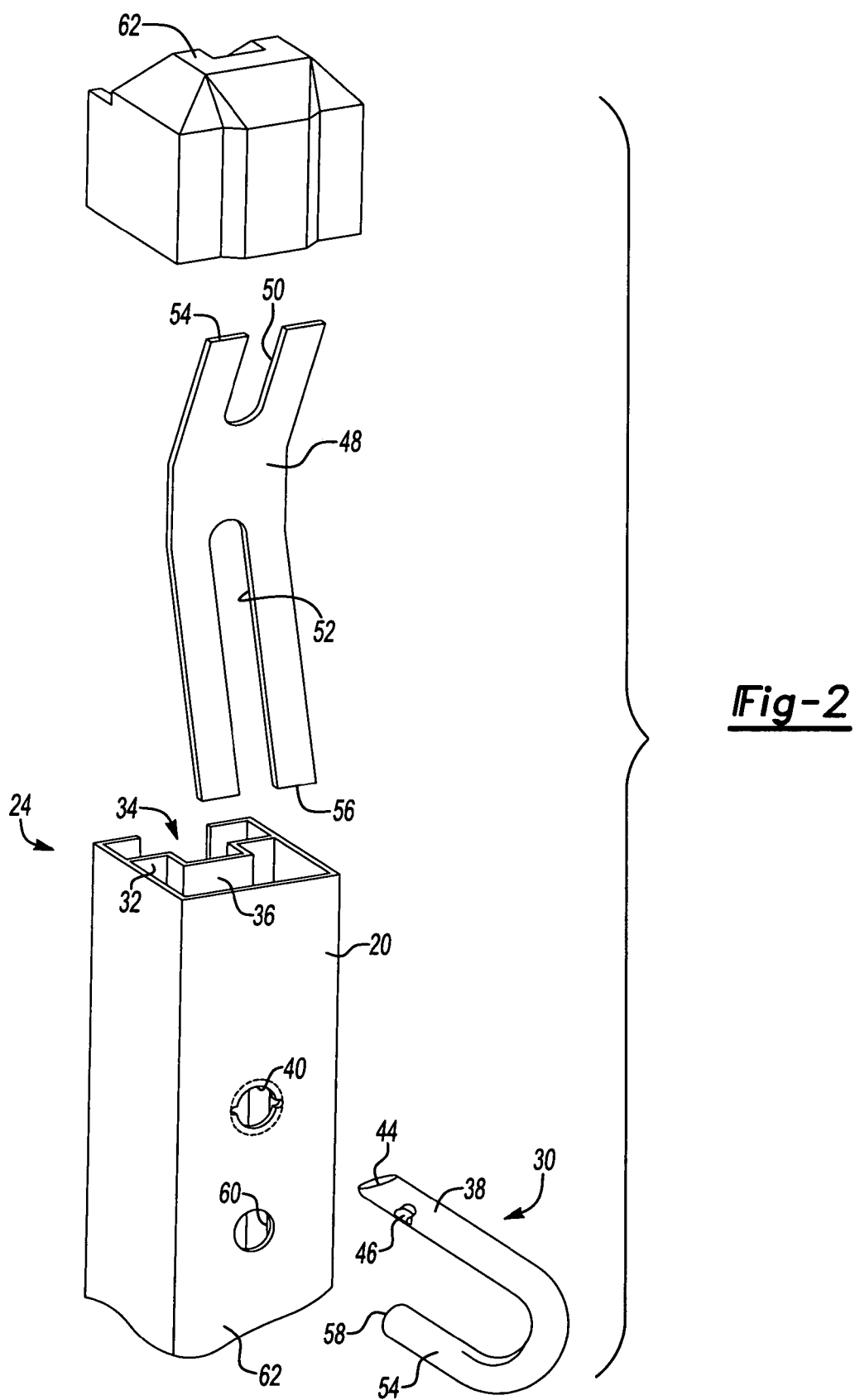
FIG. 2 is an exploded perspective view of a first embodiment of the sign release mechanism of the present invention.
Figure 3:
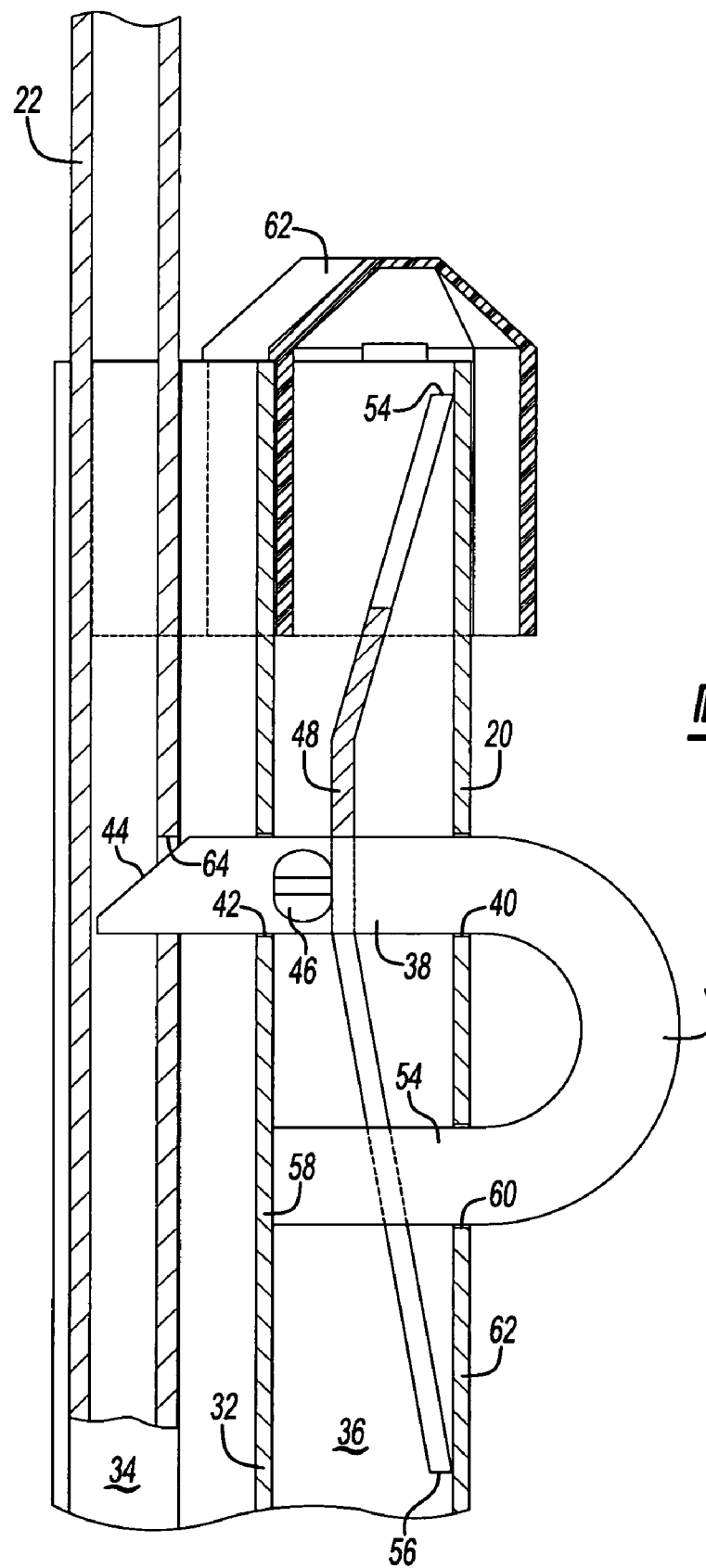
FIG. 3 is a side cross-sectional view of the sign release mechanism shown in FIG. 2 as assembled.

With reference now to FIGS. 2 and 3, the sign release mechanism 24 includes a generally J-shaped lock-pin 30. It will be readily apparent to those skilled in the art that the shape of the lock-pin 30 is exemplary in nature and may vary in accordance with particular design considerations. The upright 20 has a generally rectangular cross section with an interior wall 32 which defines first and second cavities 34, 36. The vertical brace 22 is slidably received in the first cavity 34 for interconnecting the sign assembly 14 and the base assembly 12. A leg portion 38 of the lock-pin 30 is slidably disposed through the second cavity 36, through an aperture 40 in upright 20 and into first cavity 34 through an aperture 42 in interior wall 32. As seen in FIG. 2, aperture 40 is contoured to permit the ears 46 formed on lock-pin 30 to pass therethrough. Alternatively, aperture 40 may be oversized as indicated by the dashed circle in FIG. 2. An end 44 of the leg portion 38 is tapered for providing a cam surface as described in further detail herein below. A pair of ears 46 are formed into the leg portion 38. As presently preferred these ears 46 are swaged into the lock pin 30; however, other metal forming operations could be used to provide the ears 46.

Figure 4:
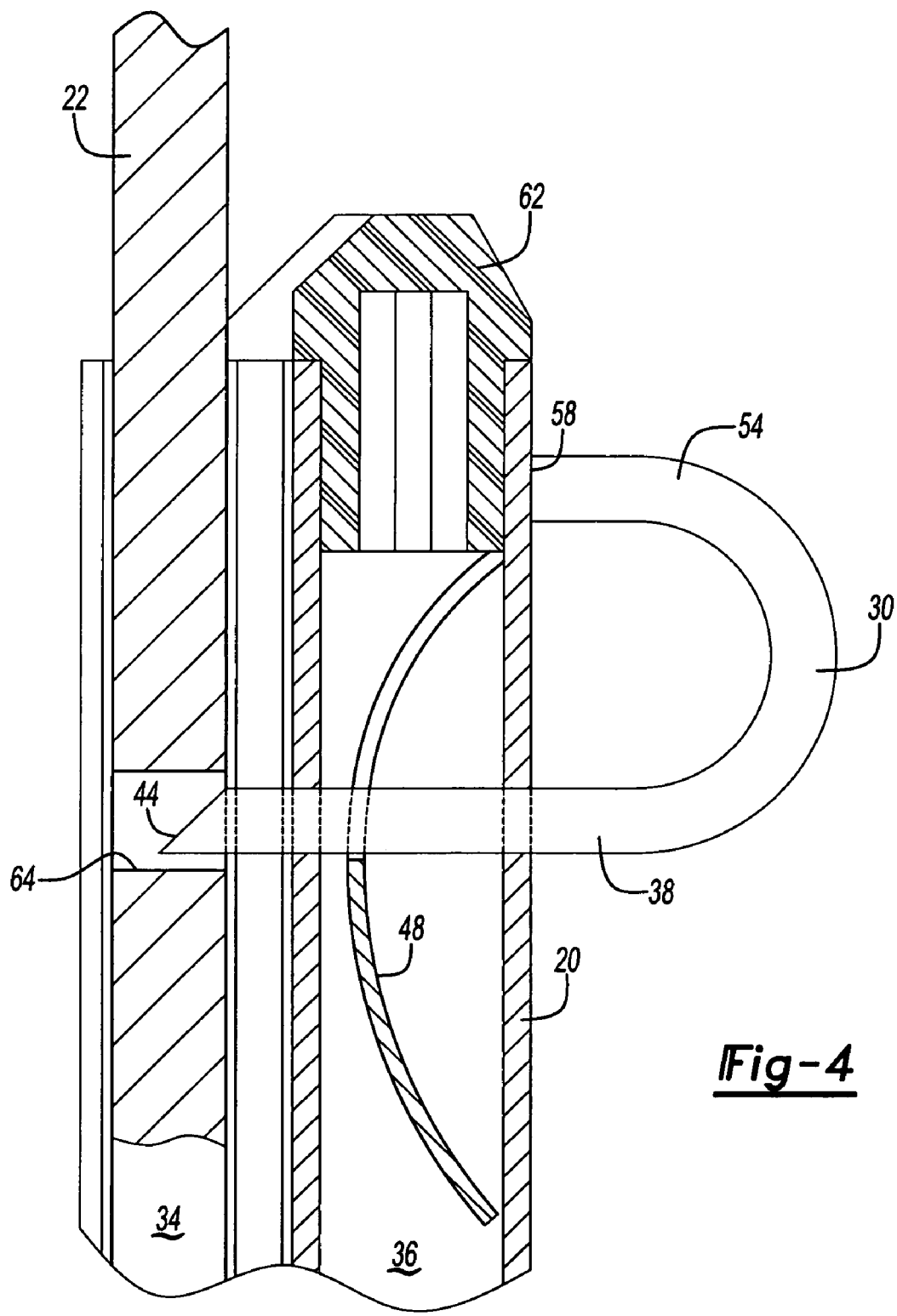
FIG. 4 is a side cross-sectional view of the sign release mechanism according to a second embodiment of the present invention.

A spring 48 is provided for biasing the lock-pin 30 in a first position, whereby the first leg portion 38 of the lock-pin 30 extends into the first cavity 34. In accordance with the first and second exemplary embodiments (as shown in FIGS. 2-4), the spring 48 is generally bow-shaped having first and second slots 50, 52 disposed through respective ends. The second slot 52 receives leg portion 38 so that ears 46 engage spring 48 near its apex, thereby interconnecting the spring 48 for movement with the lock-pin 30. The second slot 52 also receives leg portion 54 of the lock-pin 30, whereby the lock-pin 30 is slidable therethrough. The ends 54, 56 of the spring 122 seat against an inside surface of the second cavity 36 for providing a spring seat as best seen in FIGS. 3 and 4. As presently preferred, lock-pin 30 is formed by bending a constant circular cross-section piece (e.g. ⅜" square rod) to form a generally J-shaped pin. In the case of the first and second preferred embodiments, the ears 46 may be swaged into lock-pin 30 during the bending operation to provide an engagement element having a diameter that is greater than the nominal diameter of the lock-pin 30. In this way, a very inexpensive component of the sign release mechanism 24 is fabricated.

The end 58 of leg portion 54 engages interior wall 32 of upright 20 so as to function as a stop to limit travel of lock-pin 30 at the first position. With reference to FIGS. 2 and 3, a second aperture 60 is formed in the sidewall 62 of upright 20 to receive leg portion 54. As lock-pin 30 is biased toward the first position, leg portion 54 is received through aperture 60 and engages interior wall 32 as best seen in FIG. 3. At this point, lock-pin 30 is prevented from sliding further into upright 20. In this embodiment, leg portion 54 further functions to maintain the lock-pin 30 in the proper orientation within the upright 20 and to support the lock-pin 30 for reciprocating, sliding movement therein. With reference to FIG. 4, the end 58 of leg portion 54 engages the side wall 62 of upright to function to prevent lock-pin for sliding further into upright 20.

Figure 5:
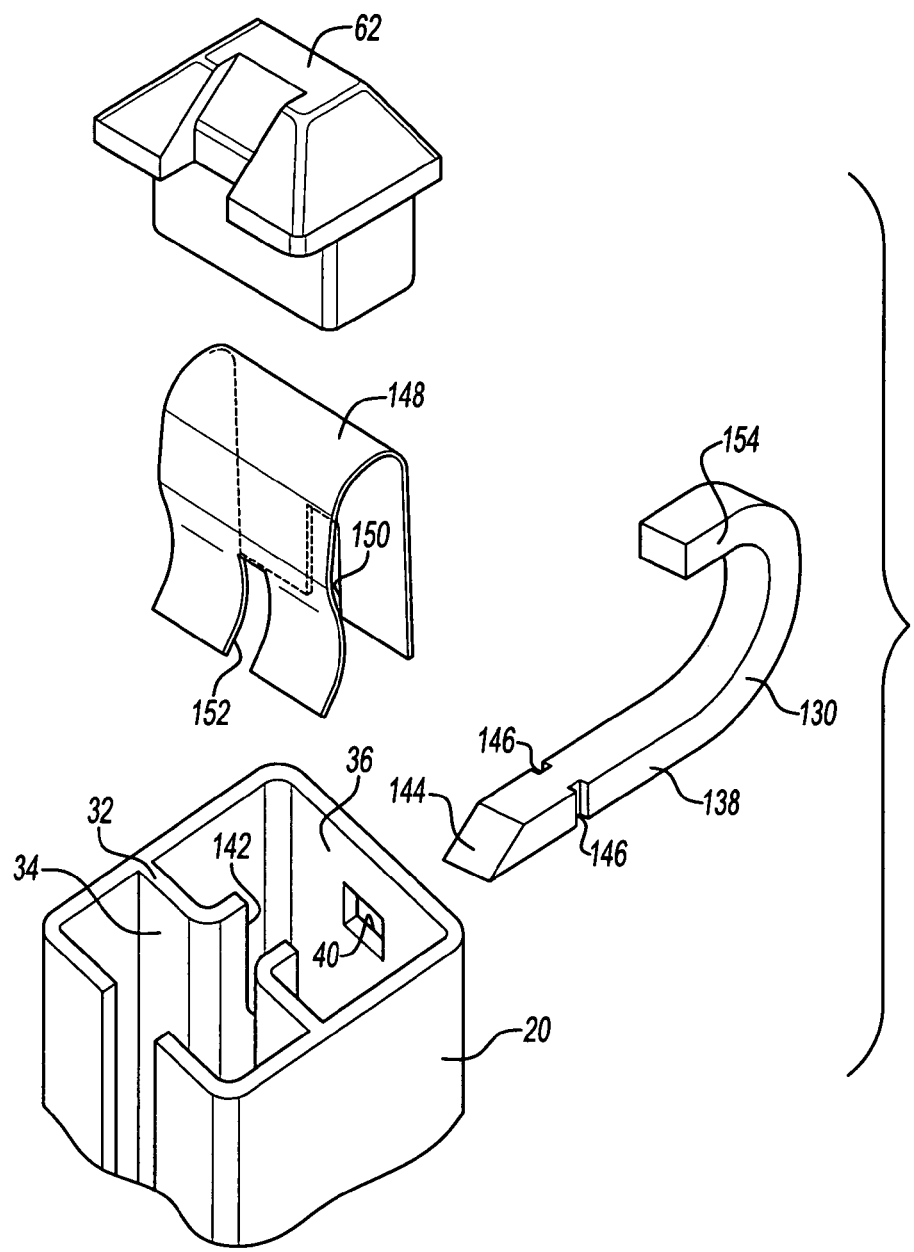
FIG. 5 is an exploded perspective view of the sign release mechanism according to a third embodiment of the present invention.
Figure 6:
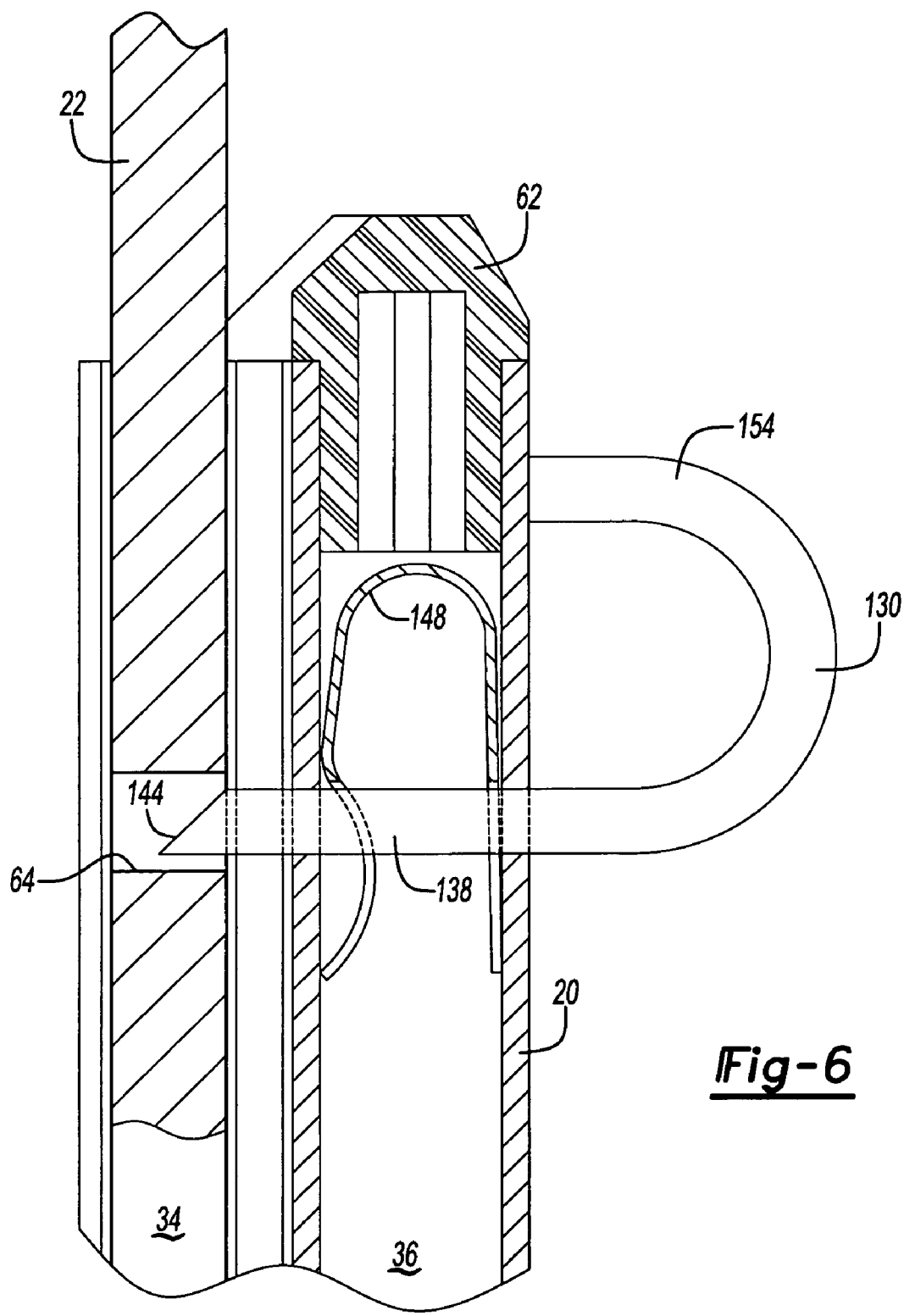
FIG. 6 is a side cross-sectional view of the sign release mechanism shown in FIG. 5 as assembled.

Referring now to FIGS. 5 and 6, a third embodiment of sign release-mechanism 124 is shown including upright 20 and spring 148. Lock-pin 130 is generally square in cross-section and includes first and second leg portion 138, 154 configured to extend through aperture 40 in upright 20. First end 138 further extends through slot 142 formed in interior wall 36 into first cavity 34. Spring 148 is generally u-shaped and includes first and second slots 150, 152 disposed through respective ends to receive leg portion 138 of lock-pin 130. Notches 146 are formed in leg portion 138 of lock-pin 130 to engage an inboard edge of spring 148 thereby biasing lock-pin 130 in the first position. As presently preferred, lock-pin 130 is formed by bending a constant square cross-section piece (e.g. ⅜" bar stock) to form a generally J-shaped pin. Notches 146 are machined into lock-pin 130 in a separate bending operation to provide an engagement element having a diameter that is less than the nominal diameter of the lock-pin 130. As previously discussed, other forming operations may be utilized to provide an engagement element between lock pin 130 and spring 148.

Springs 48, 148 in accordance with each exemplary embodiment described above, is disposed within the second cavity 36 of the upright 20, for biasing the lock-pin 30, 130 in the first position. The lock-pin 30, 130 is movable toward a second position whereby the first leg portion 38, 138 is partially retracted from extension into the first cavity 34. A cap 62 is further provided for covering an end of the upright 20, thereby enclosing the second cavity 34 and maintaining position of the spring 48, 148. Cap 62 is secured to upright 20 by adhesive or other suitable fastener.

To interconnect the base and sign assemblies 12,14, the vertical brace 22 of the sign assembly 14 is slid into engagement with the first cavity 34 of the upright 20. As the vertical brace 22 slides downward within the first cavity 34, the lock-pin 30, 130 is in the first position, whereby the first portion 38, 138 extends into the first cavity 34. As the vertical brace 22 contacts the first portion 38, 138 of the lock-pin 30, the vertical brace 22 slides against the cam surface 44, 144 of the first portion, thereby biasing the lock-pin 30, 130 back towards the second position. In this manner, the vertical brace 22 is able to slide further into the first cavity 34 of the upright 20. The vertical brace 22 includes a recess or hole 64. As the vertical brace 22 slides along the first cavity 34, the recess 64 selectively align with the lock-pin, whereby the lock-pin 30, 130 biased by the spring 48, 148 engages therein. Once engaged with the lock-pin 30, 130 the vertical brace 22 is prohibited from vertical movement within the first cavity 34. The vertical brace 22 may include multiple recesses or holes to permit selective location of the sign assembly 14 relative to the upright 20.

To adjust or remove the sign assembly 14 within the first cavity 34, the lock-pin 30, 130 is pulled against the bias of the spring 48, 148 thereby moving to the second position. In the second position, the lock-pin 30, 130 is disengaged from the recess 64. While the lock-pin 30, 130 is in the second position, the vertical brace 22 is slidable within the first cavity 34. Thus, the sign assembly 14 can be removed from interconnection with the base assembly 12 or alternatively, the sign assembly 14 can height-adjusted relative to the base assembly 12 by aligning the lock-pin 30, 130 with a recess 64 corresponding to a desired height.

The present invention greatly simplifies the assembly of the sign release mechanism 24 into the upright 20 over other prior art devices. The lock-pin 30 is completely supported by the upright 20 and the cap 62 serves only to cover the top of the upright. In this way, the use of a single lock-pin supported within the upright eliminates assembly and tolerance concerns associated with conventional sign release mechanisms.

In general, assembly of the sign release mechanism 24, 124 is performed as follows. The lock-pin 30, 130 is received through apertures 40, 42 and 60, respectively. The lock-pin 30 is then held in the first extended position such that the end 44, 144 having camming surface extends into the first cavity 34. Spring 48, 148 is positioned axially into the second cavity 36 defined by the upright 20 and interior wall 32. Leg portions 38, 138 are received within slot 52, 152 and engagement element 46, 146 are located on the outer surface of spring 48, 148. Spring 48, 148 may be preloaded or compressed slightly during location. Once properly located, spring 48, 148 and engagement element 46, 146 cooperate to hold the spring in proper orientation and to bias the lock-pin toward the extended position. Finally, the cap 62 is assembled onto the upright 20 to locate the spring 48 and cover the internal components.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A portable sign assembly comprising:
   a sign assembly including a vertical brace extending therefrom;
   a base assembly including an upright for slidably receiving said vertical brace therein, said upright having an upright end defining an open end, thereby supporting said sign assembly;
   a release mechanism for selectively interconnecting said sign assembly and said base assembly, said release mechanism comprising:
      a lock-pin located near said open end and directly supported by a wall portion of said upright for sliding movement between a first position and a second position; and
      a biasing member for biasing said lock-pin in said first position, wherein said lock-pin engages an aperture of said vertical brace when in said first position for prohibiting sliding of said vertical brace relative to said upright and disengages said vertical brace when in said second position for permitting sliding motion of said vertical brace relative to said upright; and
   a cap secured on said open end of said upright for at least partially covering said upright without engaging said lock-pin.

2. The portable sign assembly of claim 1 wherein said lock-pin comprises a generally J-shaped pin having a first extended portion and a curved portion, wherein said first extended portion is slidably disposed through said upright.

3. The portable sign assembly of claim 1 wherein said lock-pin selectively interfaces one of a plurality of notches disposed along said vertical brace for selectively prohibiting sliding movement of said vertical brace relative to said upright and positionally adjusting said vertical brace relative to said upright.

4. The portable sign assembly of claim 1 wherein said biasing member is a leaf spring.

5. The portable sign assembly of claim 4 wherein said leaf spring includes a slot for receiving said lock-pin therethrough and wherein edges of said slot engages said lock-pin for providing a direct connection therebetween.

6. The portable sign assembly of claim 5 wherein said lock-pin has an ear extending for engaging edges of said slot.

7. The portable sign assembly of claim 5 wherein said lock-pin includes notches for engaging edges of said slot.

8. The portable sign assembly of claim 1 wherein said biasing member is a generally U-shaped spring.

9. The portable sign assembly of claim 8 wherein said generally U-shaped spring includes first and second slots for receiving said lock-pin therethrough.

10. The portable sign assembly of claim 9 wherein said lock-pin is in direct connection with said first slot for concurrent motion therewith and is freely slidable through said second slot.

11. The portable sign assembly of claim 9 wherein said lock-pin includes notches for engaging edges of said first slot.

12. The portable sign assembly of claim 1 wherein said lock-pin includes a cammed end for enabling the first member to selectively bias said lock-pin in said second position as the first member slides relative to the second member.

13. A portable sign assembly comprising:
   a sign assembly including a vertical brace extending therefrom;
   a base assembly including an upright for slidably receiving said vertical brace therein, said upright having an upright end defining an open end, thereby supporting said sign assembly;
   a release mechanism for selectively interconnecting said sign assembly and said base assembly, said release mechanism comprising:
      a lock-pin located near said open end and directly supported by a wall portion of said upright for sliding movement between a first position and a second position;
      a biasing member in direct interconnection between said upright and said lock-pin for biasing said lock-pin in said first position, wherein said lock-pin engages an aperture of said vertical brace when in said first position for prohibiting sliding of said vertical brace relative to said upright and disengages said vertical brace when in said second position for permitting sliding motion of said vertical brace relative to said upright; and
   a cap secured on said open end of said upright for covering said upright without engaging said lock-pin.

14. The portable sign assembly of claim 13, wherein said lock-pin extends through said upright and bypasses said cap so as to be supported by said wall portion of said upright.

15. A method of constructing a release mechanism for a portable sign stand, the method comprising the steps of:
   inserting a lock-pin having a first leg and a second leg into a first end of an elongated member in a first direction such that said first leg of said lock-pin is received in a first aperture of said elongated member and directly supported by said elongated member for sliding movement therein;
   positioning said lock-pin in an extended position such that an engagement element formed on said first leg is located within an interior volume of said elongated member;
   providing a leaf spring having a slot formed therein;

applying a compressive force on said leaf spring and simultaneously inserting said leaf spring into an end of said elongated member such that said slot formed in said leaf spring circumscribes said first leg; and releasing said leaf spring such that said engagement element engages said leaf spring to bias said lock-pin toward said extended position.

16. The method of constructing the release mechanism of claim 15 wherein said lock-pin is formed from a generally straight, constant diameter elongated member.

17. The method of constructing the release mechanism of claim 15 wherein said engagement element includes two ears extending from an exterior surface of said lock pin, said ears having a dimension greater than the diameter of said first leg for engaging said leaf spring.

18. The method of constructing the release mechanism of claim 17 wherein said second leg of said lock pin acts as a stop for engaging a portion of said first member when said lock-pin is in said extended position.

19. The method of constructing the release mechanism of claim 15 further comprising the step of securing an end cap on a free end of said first member.

20. The method of constructing the release mechanism of claim 15 wherein the step of forming a lock pin comprises the step of machining said lock-pin to form a slot having a dimension less than the diameter of said first leg for engaging said leaf spring.

21. The method of constructing the release mechanism of claim 15 wherein said first and second legs of said lock-pin are fixedly connected by an arcuate member such that said lock-pin comprises a generally U-shape.

22. The method of constructing the release mechanism of claim 15 wherein said elongated member includes a first interior volume and a second interior volume such that said engagement element is located in said first interior volume when said lock-pin is in a retracted position and in said second interior volume when said lock-pin is in said extended position.

23. A portable sign assembly comprising:
a sign assembly having a vertical brace;
a base assembly including an upright having a side wall and an interior wall, said upright having an upright end defining an open end, a first cavity and a second cavity, said first cavity slidably receiving said vertical brace to support said sign assembly in an upright position;
a lock-pin located near said open end and directly supported by a wall portion of said side wall and said interior wall for sliding movement between a first position and a second position;
a spring for biasing said lock-pin toward said first position; and
a cap member for covering said second cavity of said upright without engaging said lock-pin;
wherein a free end of said lock-pin is positioned away from said interior wall when in said first position to engage and retain said vertical brace within said first cavity; and
wherein a free end of said lock-pin is positioned towards said interior wall when in said second position to disengage and release said vertical brace within said first cavity.

24. The portable sign assembly of claim 23, wherein the cap is removably secured on said open end and covering said second cavity without engaging said lock pin.

25. The portable sign assembly of claim 24, wherein said lock-pin extends through said upright and bypasses said cap so as to be supported by said wall portion of said upright.

26. The portable sign assembly of claim 23 wherein said lock-pin selectively interfaces one of a plurality of notches disposed along said vertical brace for selectively prohibiting sliding movement of said vertical brace relative to said upright and selectively adjusting the location of said vertical brace within said channel.

27. The portable sign assembly of claim 23 wherein said spring is disposed within said upright and in direct interconnection between said upright and said lock-pin.

28. The portable sign assembly of claim 27 wherein said spring comprises a leaf spring having a slot for receiving said lock-pin therethrough and wherein edges of said slot engage said lock-pin for providing a direct connection therebetween.

29. The portable sign assembly of claim 28 wherein said lock-pin has an ear extending for engaging edges of said slot.

* * * * *